(12) United States Patent
Cotton et al.

(10) Patent No.: US 8,259,707 B2
(45) Date of Patent: *Sep. 4, 2012

(54) WIRELESS ACCESS POINT NETWORK SYSTEM SUPPORTED THROUGH EXISTING TRANSMISSION LINES

(75) Inventors: John M. Cotton, Rochester, NY (US); Robert A. Macaluso, Webster, NY (US); Perlis Joseph Trahan, Ontario, NY (US); Douglas R. Milliman, Baldwinsville, NY (US); Neil C. Olsen, Milford, CT (US)

(73) Assignee: Generonix, Inc., Rochester, NY (US)

( * ) Notice: Subject to any disclaimer, the term of this patent is extended or adjusted under 35 U.S.C. 154(b) by 576 days.

This patent is subject to a terminal disclaimer.

(21) Appl. No.: 11/550,350

(22) Filed: Oct. 17, 2006

(65) Prior Publication Data

US 2008/0089273 A1 Apr. 17, 2008

(51) Int. Cl.
*H04L 12/66* (2006.01)

(52) U.S. Cl. ........ 370/352; 370/353; 370/354; 370/401; 455/572; 455/127.1

(58) Field of Classification Search .................. 370/328, 370/420, 353, 401, 338, 340, 315, 352, 354, 370/389, 392, 400, 402, 421, 422; 455/402, 455/572, 127.1, 270, 343.1, 343.6; 379/66, 379/106.4

See application file for complete search history.

(56) References Cited

U.S. PATENT DOCUMENTS

| | | | |
|---|---|---|---|
| 4,177,389 A * | 12/1979 | Schott | 307/64 |
| 5,936,949 A | 8/1999 | Pasternak et al. | |
| 6,118,780 A | 9/2000 | Dunn et al. | |
| 6,236,726 B1 * | 5/2001 | Darveau | 379/417 |
| 6,492,897 B1 * | 12/2002 | Mowery, Jr. | 455/522 |
| 6,778,817 B1 * | 8/2004 | Bullock et al. | 455/402 |
| 6,904,129 B1 * | 6/2005 | White | 379/25 |
| 6,947,736 B2 * | 9/2005 | Shaver et al. | 455/424 |
| 7,046,973 B2 * | 5/2006 | Ketonen et al. | 455/127.1 |
| 7,113,591 B2 * | 9/2006 | Lomax, Jr. et al. | 379/413 |
| 7,127,048 B2 * | 10/2006 | Bremer et al. | 379/93.09 |
| 7,542,513 B2 * | 6/2009 | Propp et al. | 375/260 |
| 7,742,069 B2 * | 6/2010 | Payne | 348/14.01 |
| 2001/0015978 A1 * | 8/2001 | Blanset et al. | 370/395 |
| 2003/0133413 A1 * | 7/2003 | Mehravari | 370/235 |
| 2003/0161329 A1 * | 8/2003 | Corey, Jr. | 370/395.64 |
| 2003/0224784 A1 * | 12/2003 | Hunt et al. | 455/426.2 |
| 2004/0141609 A1 * | 7/2004 | Shi | 379/413.02 |
| 2005/0111533 A1 * | 5/2005 | Berkman et al. | 375/220 |
| 2005/0220180 A1 * | 10/2005 | Barlev et al. | 375/222 |
| 2006/0284606 A1 * | 12/2006 | Chen et al. | 323/259 |
| 2007/0097933 A1 * | 5/2007 | Kuc | 370/338 |
| 2007/0121795 A1 * | 5/2007 | Buskmiller et al. | 379/24 |

OTHER PUBLICATIONS

PCT International Search Report and Written Opinion dated Mar. 5, 2008 (10 pages).
International Search Report mailed Nov. 5, 2008.

* cited by examiner

*Primary Examiner* — Kamran Afshar
*Assistant Examiner* — Marisol Fahnert
(74) *Attorney, Agent, or Firm* — Crowell & Moring LLP

(57) ABSTRACT

A system for establishing a universal or overlapping wireless broadband network composed of a plurality of Access Points (AP). These APs may be coupled to existing copper transmission lines, and may work alone or in groups to provide wireless network access. Different types of APs may be utilized to perform various communication-functions, and these nodes may obtain power and/or communication resources from the existing copper transmission lines. Further, peripheral devices may be coupled to nodes to provide ancillary functionality to the system.

24 Claims, 5 Drawing Sheets

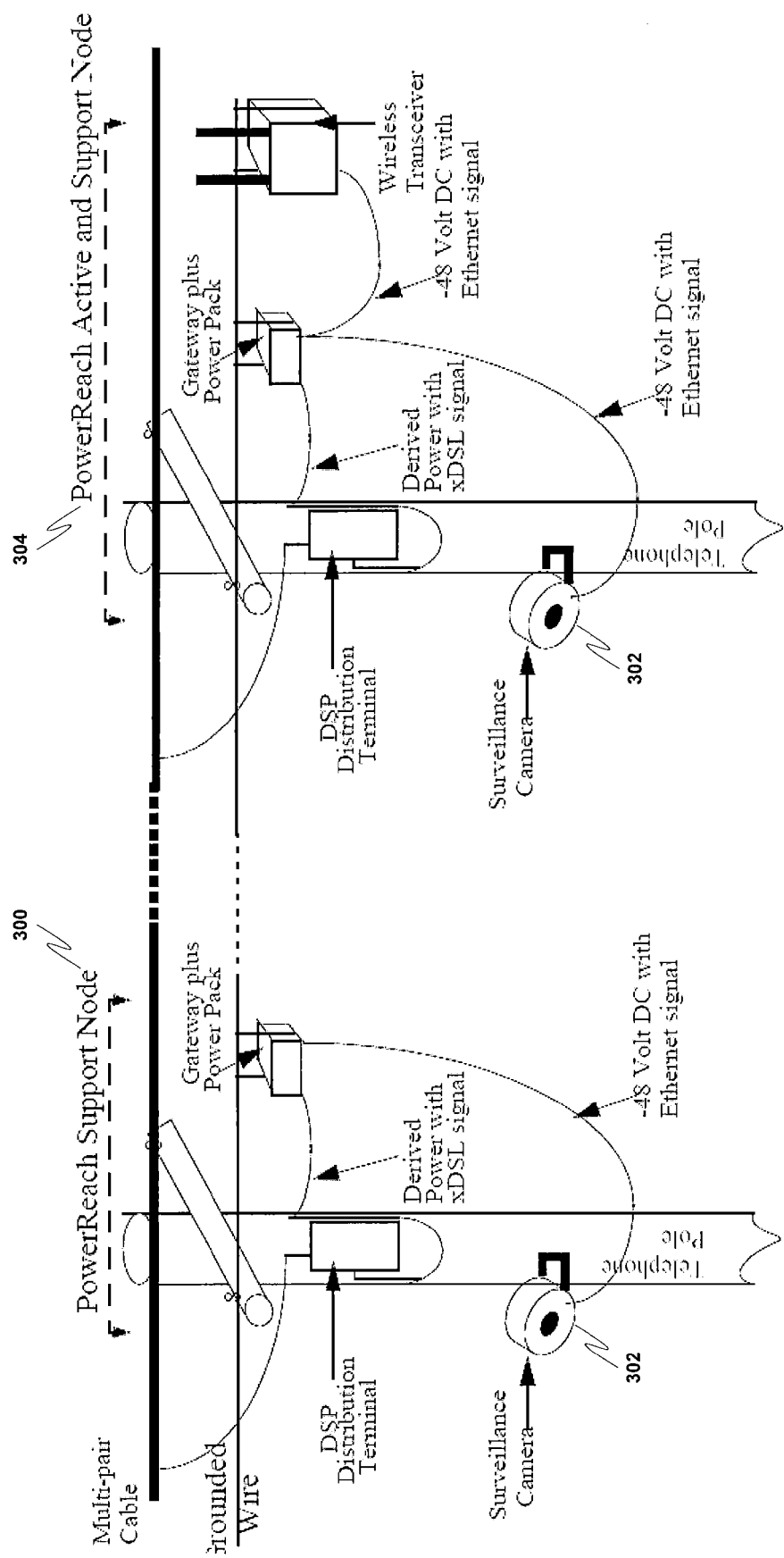

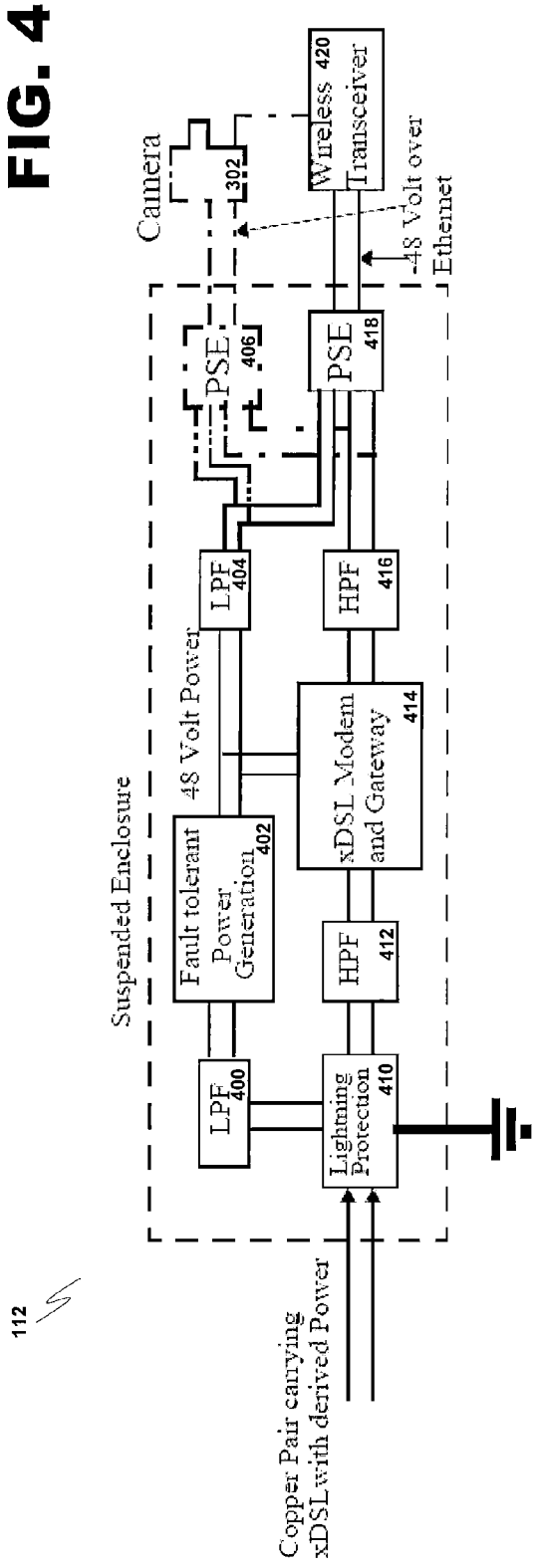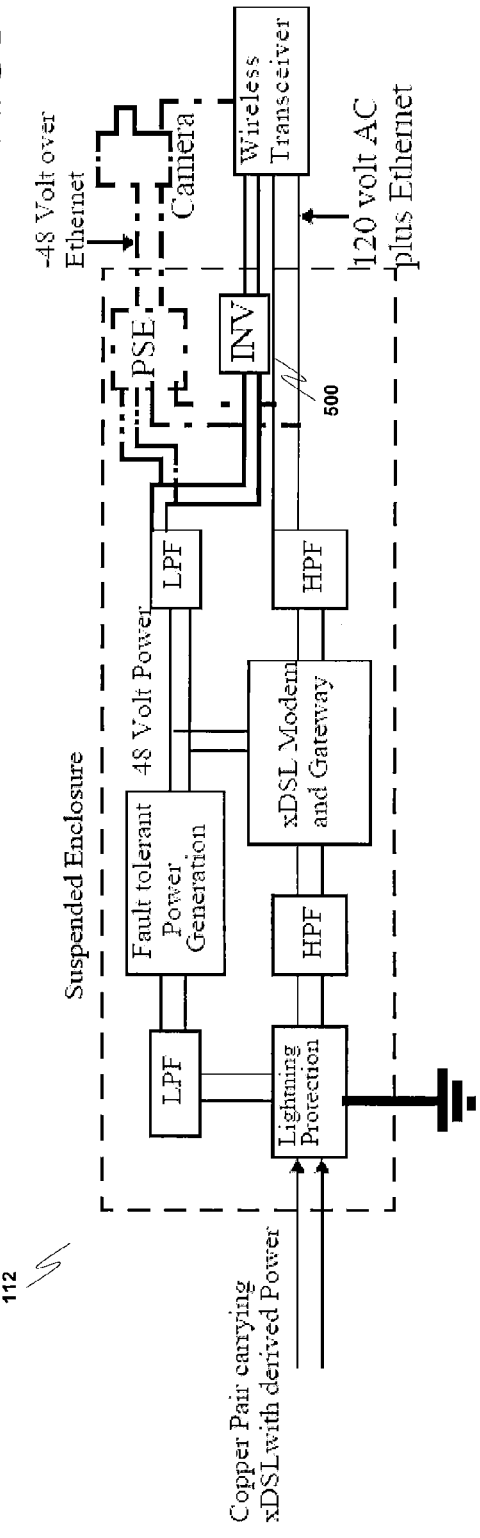

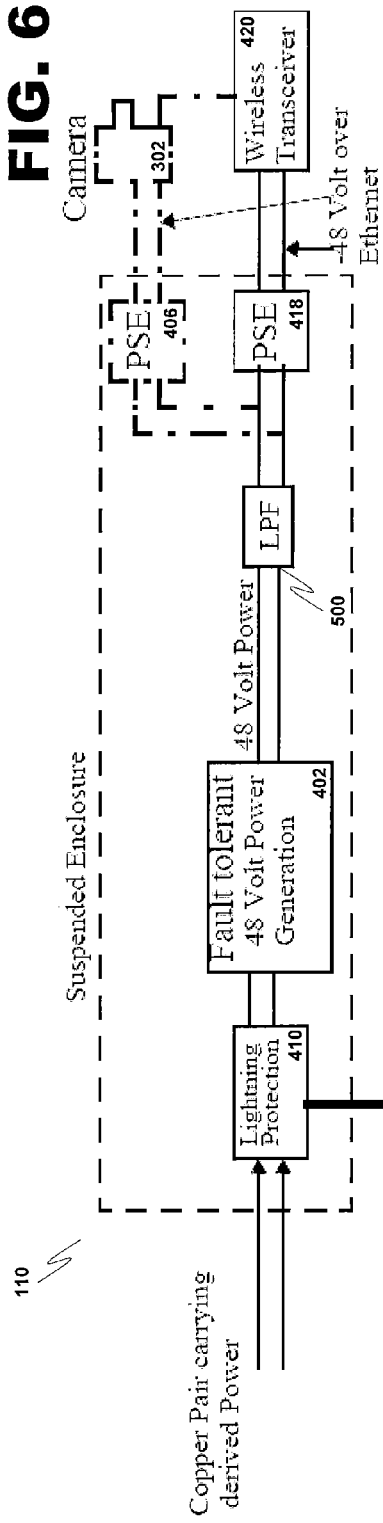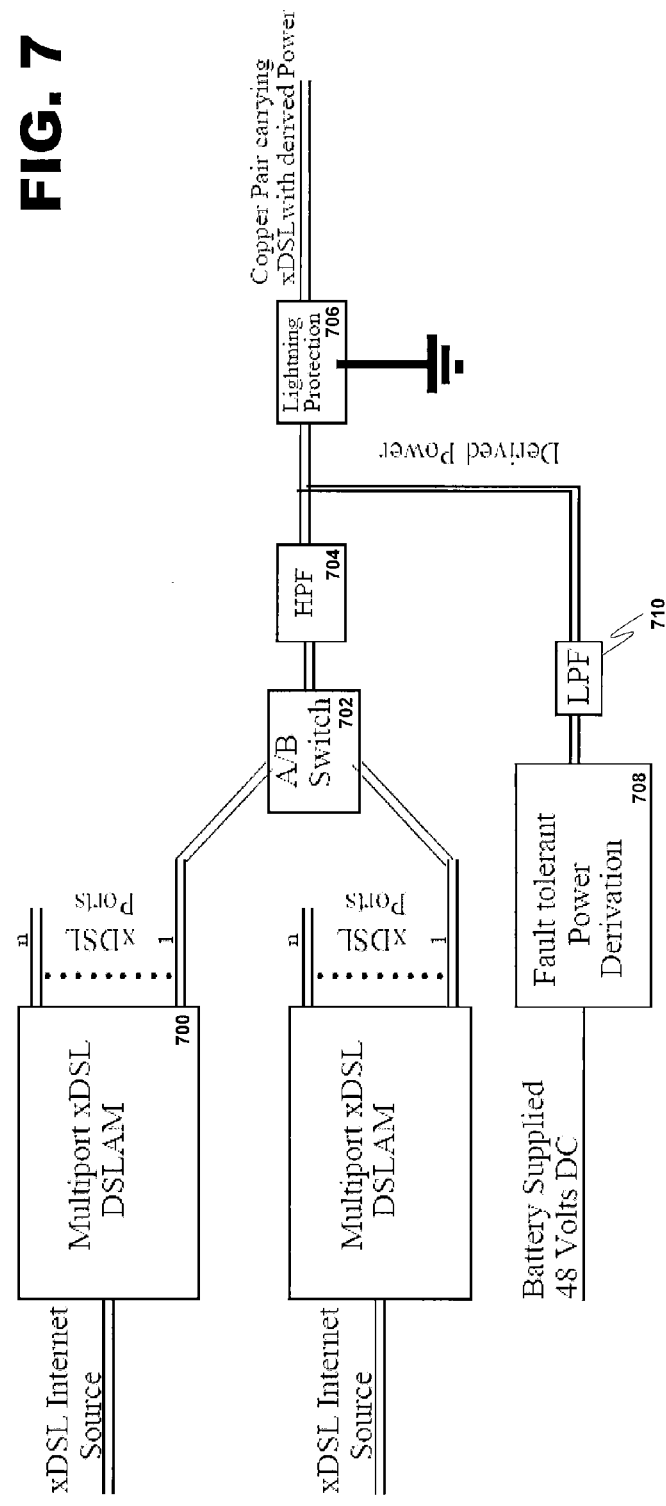

WIRELESS ACCESS POINT NETWORK SYSTEM SUPPORTED THROUGH EXISTING TRANSMISSION LINES

BACKGROUND OF INVENTION

1. Field of Invention

The present invention relates to a system for providing a wireless connection to a wide area network, and more specifically, to establishing a network of wireless access points supported, at least with respect to power and communications, by existing transmission lines.

2. Description of Prior Art

Public access through copper wire connection to the Internet has for many years been provided by means such as Cable Modems or modems on Digital Subscriber Lines. One or more subscribers on Cable Modems may share the bandwidth of a single physical link, and so the available bandwidth may be limited if there are multiple concurrent transfers. Digital Subscriber Lines (DSL), on the other hand, provide a separate physical link per subscriber. Although DSL bandwidth was initially limited, emerging technologies, such as VDSL2, are able to provide up to 100 Mbit/second throughput per subscriber. Further, both of these access methods require a wired connection to a cable or telephony network which eventually connects to the Internet.

In a typical use scenario, at least one computing device may be coupled to a DSL modem providing access to the Internet for a subscriber through a standard telephone twisted copper wire pair. This copper-wire connection eventually couples to communication equipment, for example, a Digital Subscriber Line Access Multiplexer (DSLAM), which may aggregate a plurality of such front-end connections for the transmission of the combined signals over media capable of higher communication volume (e.g., fiber optic cable), but occasionally over landlines or radio links. Internet Service Providers manage these connections, receive subscriber information from DSLAMS, and convey the received information to required destinations, such as other ISPs and DSLAMS, over the Internet backbone.

More recently, emerging wireless technology has been able to provide telephony voice and data transmission—typically using mobile cellular communication devices—over licensed radio bands without requiring a user to be physically tethered to the network over a cable connection. However, licensed bandwidth is somewhat limited. Building on this idea of using wireless communication media to remove the need for a wired connection to a network, radio connection devices based on unlicensed radio bands, known in some cases as wireless Access Points (AP), have been introduced between a hardwired modem and wirelessly-enabled computing equipment. A wireless Access Point, typically powered by wired power connection, may allow one or more wirelessly enabled computing devices within effective transmission range of the of the Access Point to access the Internet. One exemplary technology known in the industry is Wi-Fi, and the region within the radio range of the AP is known as a Wi-Fi Hotspot.

Some municipalities are installing, or are proposing to install, a network of overlapping Hotspots in order to provide "universal" access to the Internet for public use. This wireless access may be used for education, for law enforcement, or for other government service use. To date, the majority of these wide-area public hotspot networks have been provided with Internet access directly through fiber optic cable or wireless broadband backhaul, and the Access Point nodes have been powered by connecting to the power grid through street lights or building wiring and where power grid failure must be ameliorated by the use of local batteries. Such wide-area networks have proved expensive and difficult to install, the expense and difficulty coming at least from installing new fiber cable and from obtaining access to power.

What is therefore needed is a system for providing universal or overlapping wireless broadband access to users that is easy and cost-effective to install, as well as being manageable to support while providing adequate coverage and performance to meet user needs.

SUMMARY OF INVENTION

The present invention includes at least a device and system for establishing a universal or overlapping wireless broadband network composed of a plurality of Access Points (AP). These APs may be coupled to existing copper transmission lines, and may work alone or in groups to provide wireless network access. Further, different types of APs may be utilized to perform various communication-functions.

In at least one embodiment of the invention, the relationship between a node and an existing copper transmission line may be multi-faceted. An aerial mounting on a transmission line may, for example, provide a beneficial vantage point from which the AP may be able to receive information from a large number of wireless-enabled computing devices. The transmission line may also provide a wired communication path for the AP to communicate with other APs or possible a central information collection facility. Further, the AP may receive power from the transmission line supplied from a central battery whose charge is maintained automatically. All of these requirements may be serviced by an existing copper transmission line, which minimizes the amount of installation required for the system and separates the power source from the vagaries of the power grid.

Further, in another example of the invention, different types of APs may be employed in the creation of the wireless network. These APs may include active nodes, support nodes and nodes that support connection of peripheral devices. For example, a surveillance system may be integrated with the wide area network to improve security. Again, all of these features may utilize existing wired resources in order to avoid a costly and difficult installation.

DESCRIPTION OF DRAWINGS

The invention will be further understood from the following detailed description of a preferred embodiment, taken in conjunction with appended drawings, in which:

FIG. 3 discloses an exemplary access point configuration including an active node and a support node in accordance with at least one embodiment of the present invention.

FIG. 4 discloses an exemplary functional diagram of an access point active node configuration in accordance with at least one embodiment of the present invention.

FIG. 5 discloses an alternative functional diagram of an access point active node configuration in accordance with at least one embodiment of the present invention.

FIG. 6 discloses an exemplary functional diagram of an access point support node configuration in accordance with at least one embodiment of the present invention.

FIG. 7 discloses an exemplary access point active node source pair generating configuration in accordance with at least one embodiment of the present invention.

DESCRIPTION OF PREFERRED EMBODIMENT

Figure 1:
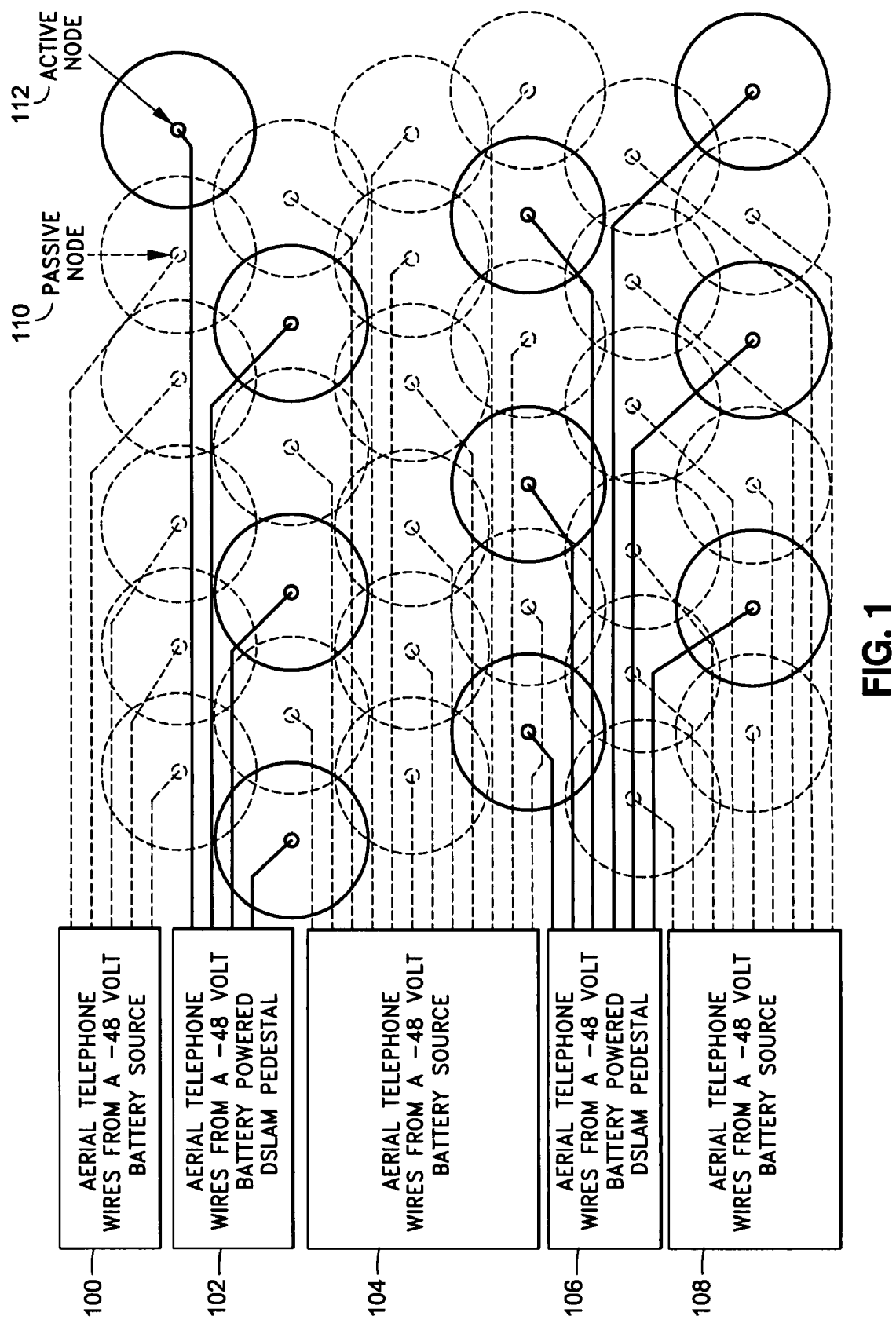
FIG. 1 discloses an example of an array of overlapping network access points coupled to one or more transmission lines in accordance with at least one embodiment of the present invention.

While the invention has been described in preferred embodiments, various changes can be made therein without departing from the spirit and scope of the invention, as described in the appended claims.

I. Components of the PowerReach System

The present invention, in at least one embodiment, may provide an array of AP nodes, called a PowerReach array, made up of PowerReach Active Nodes and PowerReach Passive Nodes. Both types of nodes may contain at least a radio transceiver to provide coordinated xDSL wireless Internet access for a region larger than just one hotspot. In a further example of the present invention, coordinated xDSL Internet access may be provided for ancillary functionality by means of PowerReach Support Nodes, which may not contain a radio transceiver, and also by support facilities incorporated on PowerReach Active Nodes. Radio controlled ancillary functions may also be supported by the PowerReach Facility Passive Nodes.

Both xDSL Internet access and power may be provided over existing telephony copper wires for PowerReach Active Nodes (PAN) and PowerReach Support Nodes (PSN), and at least power may be provided over existing telephony copper wires for PowerReach Passive Nodes (PPN). The set of node types comprising the PAN, PSN, and PPN may be generically referred to as PowerReach Facility Nodes. The PowerReach Facility Nodes may operate together to provide a system with high reliability of area radio coverage and operational fault tolerance.

At least one important feature of the present invention is the ability to provide battery backed power to the PowerReach Facility Nodes over one or more pairs of existing copper wires. The basic power source may be a central telephony installation, in which batteries are continually replenished under trickle charge, and in some instances, this primary power source may be further backed up by diesel generators. However, standard −48 volt telephony batteries can only supply adequate power over short distances because of resistive loss on the copper wires, even if only the Ring line is used and terminated at a ground source instead of returning to the battery connection over the Tip line. For longer distances a form of "derived power" may be required, wherein the −48 volt batteries at the central telephony installation may be electronically "enhanced" to a much higher voltage, for example ±190 volts, before being placed on the Ring and Tip conductors. Enhancing the voltage in this manner reduces the current requirements, and hence the resistive transmission loss, for a given power transmitted. This enhanced voltage is then converted back to a local working voltage (e.g., −48 volts) at the PowerReach Facility Nodes, thereby providing the required power.

The following terms are defined only for the sake of example and explanation when used in the following disclosure, and are not intended to be limiting. A "network," for example, may be a group of two or more nodes connected by radio, fiber, copper wires, or other media links for the purpose of transferring data among devices. The data may be a continuous isochronous stream composed of a series of dynamically sized packets, or alternatively, a series of uniform sized cells containing header and payload information. Control information may be contained in the header or in the payload. Connection links may be point-to-point, or point-to-multipoint. Each node may connect to multiple links and/or multiple devices through ports. A "bridge," for example, may be defined as an element of a node that connects nodes of two or more networks that share the same protocol at the physical level: it decides only if an incoming cell or packet should be transferred to one or more ports on the node, or forwarded on a link to another network. A "router," for example, may be an element of a node that knows how to forward a cell or packet in the node to its destination. A "gateway," for example, may be a network node that connects two or more networks, acting as an exit and egress point: the networks may use different protocols. A "modem," for example, may be a device that allows a computer or terminal to transmit data over a standard telephone line or a television distribution cable. A "transmission line," for example, means a telephony copper twisted pair. The term transmission line in other contexts may include microwave transmission lines with specialized cable having wires held parallel at a predetermined fixed distance.

II. Overlapping or Universal Wireless Network Coverage

FIG. 1 discloses an idealized array of PowerReach Facility Nodes to support a Wireless Metropolitan Area Network (WMAN) in accordance with at least one embodiment of the present invention. The node array is shown powered, for example, from −48 Volt Central Power.

The black circles in FIG. 1 depict the transmission areas reliably supplied with radio access to a set of PANs 112, which are each depicted as connected by aerial copper wires to a central telephony installation (for example 102 and 106). The telephony installation may supply both power derived from −48 volt batteries, and Internet access for each PAN 112. The copper wire connections are shown as connections to aerial transmission lines by way of example, as the connections could equally well be supplied by buried copper cables.

The grey circles depict the radio transmission areas reliably supplied with radio access to a set of PPNs 110 which are not directly connected to the Internet (for example 100, 104 and 108). These passive nodes may be interspersed between the PANs 112, such that no PAN 112 is separated by more than one PPN 110 from any of its neighboring PANs 112 to improve the fault tolerance of the network. As a consequence, in this exemplary arrangement no subscriber or user need ever be further away than one PPN 110 effective transmission range diameter from any two PANs 112. Internet access may be provided by supporting wireless routing or bridging capabilities in the APs to one or more PANs 112.

The proportion of PAN 112 to PPN 110 is adjustable from an all PAN 112 network, to a PAN 112 to PPN 110 ratio determined by traffic capacity or fault tolerance requirements. In a scenario where fault tolerance and traffic capacity is of less importance, the ratio could go to an all PPN 110 network having a radio backhaul from one or more of the PPNs 110. A mixture of radio bands may be used, providing that there are sufficient nodes present able to support bridging between more than one of the radio bands to ensure coordinated Internet access. Similar to the PAN 112 example disclosed above, each PPN 100 is depicted as being provided with operating power derived from −48 volt central batteries, and supplied over an aerial copper wire connection from a central telephony installation. The copper wire connections are shown as aerial connections by way of example, and the connections could equally well be supplied by buried cable.

In the example disclosed in FIG. 1, the PowerReach Facility nodes are shown as being placed in a regular array. This distribution may be an idealized situation, and it should be understood that practical limitations of mounting location, copper wire location, and radio transmission anomalies may cause the array to be irregular. If required, overlapping reliable radio transmission areas for each PowerReach Facility Node may be maintained in such a practical array by a mixture of the two aforementioned radio node types. Further, all PowerReach Facility nodes 110 and 112, as disclosed in FIG. 1, depict omni-directional antennae coverage. Omni-directional antennae coverage is beneficial to maintain a blanket or overlapping coverage for the region served by a PowerReach Array. However, where circumstances require, a particular PowerReach Facility node may be provided with a directional antenna.

III. PowerReach Active Node

Figure 2:
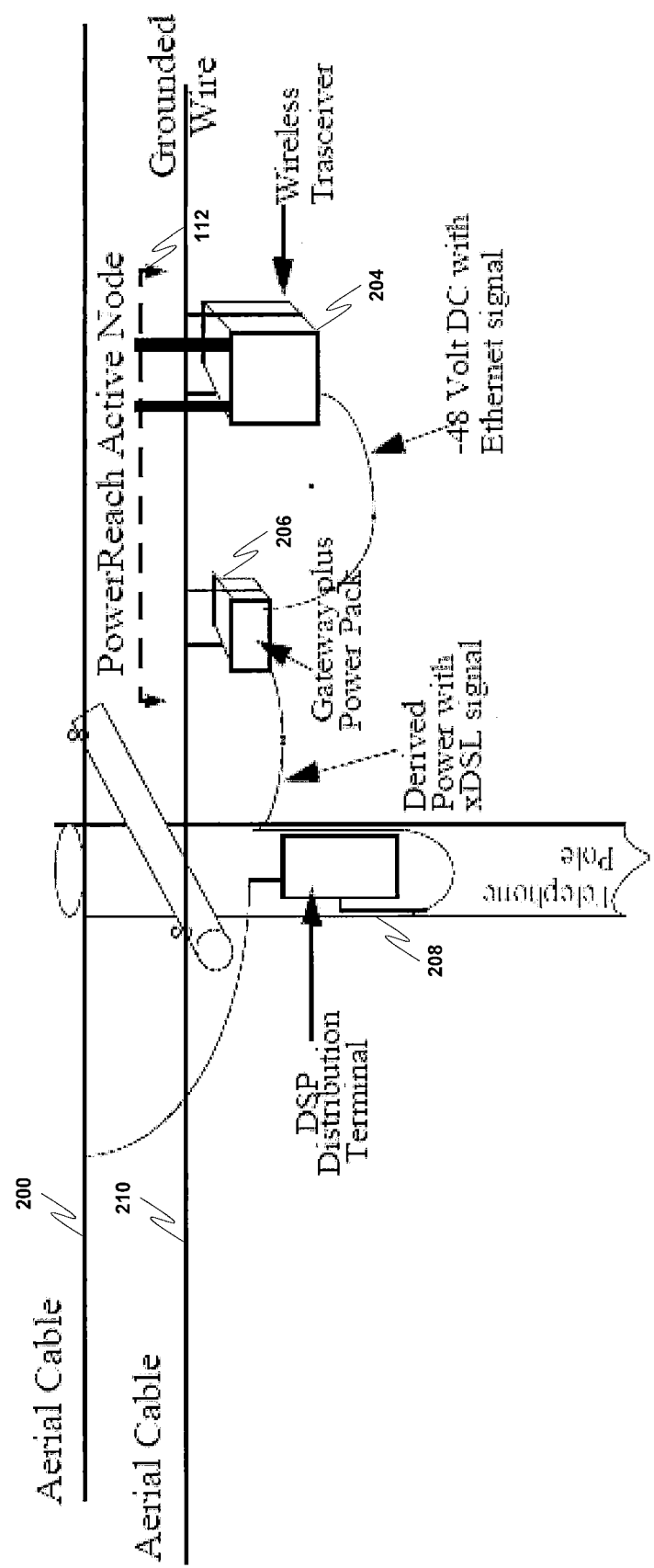
FIG. 2 discloses an exemplary access point configuration in accordance with at least one embodiment of the present invention.

In FIG. 2, PAN 112 is depicted as consisting of two equipment boxes (204 and 206) connected together by a cable, such as category 5 (or greater) four pair cable. This cable may carry at least an Ethernet 10/100 bi-directional bus connection and −48 volt power, for example, in a configuration known as "Power over Ethernet" (PoE). The previously indicated boxes (204 and 206) may be suspended by metal brackets from an electrically grounded aerial copper telephony cable 210.

On the left hand side of the drawing a connection from a copper aerial cable 200 to a distribution box 208 (DSP, or Distribution Signal Point) mounted on the telephone pole is disclosed. This connection may carry an xDSL signal and a derived power signal, and may be connected to the distribution box terminal as a means of securing the end of the connection. From there, a further connection is taken to convey the derived power and xDSL signals to the first of the two boxes 206 comprising the PAN 112. The detail of the contents of this box is described in relation to FIG. 4, but its purpose, in accordance with at least one embodiment of the present invention, is to contain the circuitry for obtaining the necessary working voltage, for example −48 volts, from a derived power signal, to obtain control signals, and to extract and insert data (which may contain Internet and/or wireless data and/or voice), from and to the xDSL signal.

The control, bi-directional media and data signals, and power voltage may be carried from the first box 206 to a second box 208 by the previously indicated type of cable. Second box 208 may contain a Wi-Fi AP (or radio transceiver) that performs the active radio modulation/demodulation and other functions required to enable wireless communication with the node.

Although the example of PAN 112 disclosed in FIG. 2 has been shown as two boxes, and suspended in an aerial transmission line configuration, this is only by way of an example, and it can alternatively have all of the required functionality contained in one box, and could alternatively be building or pole mounted with an adequate electrical ground connection.

IV. PowerReach Active Node and Support Node

FIG. 3 discloses an example of a PowerReach Support Node 300, and additional support functionality added to a PAN 112. On the left side of the figure is shown a PSN 300 supporting the operation of surveillance camera 302, by way of an example of the possible functionality that PSN 300 may support. Other possible functionality supportable by PSN 300 may include, but is not limited to, a voice terminal, audio pickup equipment, audio broadcast equipment, alarms, and visual displays. Functionality such as surveillance camera 302 presently deployed in the field may require large amounts of local memory. With the availability of access to the Internet provided by PSN 300, a shared central memory may be provided to fill this need.

On the right hand side of the figure is shown (e.g., at 304) a PAN 112 with a support function attached. Once again, surveillance camera 302 is shown by way of an example of equipment whose operation may be supported. The ultimate number of peripheral devices or functions that may be supported by a single node depends on the electrical power and/or bandwidth delivered to the node. If the power or bandwidth available from a single copper pair is insufficient, an additional one or more copper pairs may be attached to fill any deficiency.

The PSN 300 and the PAN/PSN combination 304 are shown supplied by different copper pairs from the same multi-pair cable. Once again, this is by way of an example, as the power and control and bidirectional data signals may be supplied by any copper pair connected to a central telephony installation.

V. PowerReach Active Node Components

Referring now to FIG. 4, PAN 112 may function to power a Wi-Fi Access Point transceiver 420 and activate a connection for data and control between the AP and an xDSL connection 414 to the Internet. It may also provide the power, data and control signals to other equipment, such as, for example, a surveillance camera, voice terminations, or other media in a configuration previously shown, for example, at 304. To illustrate this, a connection to camera 302 is shown as a dotted section of the right side of FIG. 4.

On the left side of FIG. 4 is shown an incoming copper pair from the centralized telephone facility. It may be first connected to a circuit 410 which provides protection to the node from lightning, surges, voltage spikes, and accidental cross connections with power lines. The signals from this incoming connection are then partitioned between the upper path through a low frequency pass filter (LPF) 400 to the power generation circuits 402, and the lower path through a high frequency pass filter (HPF) 412 to the xDSL terminating circuits 414.

An alternative arrangement (not pictured) may include having one pair of wires carrying the power derived from the copper pair transmission lines to a protection circuit and then directly to the power generation circuits 402, and a second separate pair of wires carrying the xDSL signals to a similar protection circuit and then directly to the xDSL terminating circuits 414. Where the derived power provided by one pair of wires is insufficient to support the load of multiple ancillary circuits, an additional pair, or pairs, of conductors carrying derived power may be brought in directly as described above to additional power generation circuits 402.

Power circuit 402 generates a local working power voltage (e.g., −48 volts) from the incoming derived power. The power generating circuitry may be duplicated to provide fault tolerance, if required, to increase the overall reliability of the node. The regenerated working voltage may further be converted by equipment (not shown) to lower the voltage to levels required to power the xDSL modem 414 and power delivery circuits. The working voltage then passes through a second low frequency pass filter 404 before being available for transfer to the Wi-Fi AP 420 or other equipment.

The xDSL circuit may consist of at least an xDSL intelligent modem 414 that may provide gateway functions, and may further provide firewall, web server, security, configuration, management and/or other software features. The control and data streams from and to this modem then traverse through a second high pass filter 416, before being available for transfer to the Wi-Fi transceiver or other equipment. Where additional throughput capacity is required, a technique is known to "bond" two xDSL circuits together. This bonding may require two copper pairs, and the traffic is partitioned between the two circuits. For PAN 112 to accommodate this configuration, a second copper pair carrying a second portion of the bonded signals must be coupled to the node, through a protection circuit such as 410, and through high frequency pass circuit 412 into a specially designed modem to extract the data and control from the bonded set of signals.

A "Power over Ethernet (PoE)" circuit known as a Power Sourcing Equipment (PSE) Controller 418 may be used to combine the control and data stream carried on the Ethernet over two pairs, with the working power voltage (e.g., −48 volts) on the remaining two pairs of the four pair category 5 (or greater) cable to the Wi-Fi transceiver. The −48 volt power may also, or alternatively, be carried on the signal or data wires. A similar circuit 406 may be used for camera 302 or other equipment. A further connection is shown between the AP and the camera so that control signals received by radio on the transceiver may be sent to the camera. A connection and equipment similar to PAN 112 may be used in PSN 300 to drive and control a set of surveillance cameras and/or other peripheral devices as noted in the discussion of FIG. 3.

In FIG. 5, it is further anticipated that some Wi-Fi transceivers and ancillary equipment may require AC power, for example 110 volts at 60 cycles per second. For these, and any other peripheral devices noted in FIG. 3-4 above that may require AC power, the PSE circuit 418 may be replaced by a power inverter (INV) 500 that converts the local working DC voltage into the required AC voltage. The rest of the functionality as described for FIG. 4 remains the same. Control, data, and voice signals may be carried over an Ethernet bus over two pairs of the four pairs in Category 5 (or greater) cable and the AC power is supplied via a separate power cord.

VI. PowerReach Passive Node Components

A PPN 110 may be utilized to extend the effective range of surrounding PANs 112. It may also provide for radio control of other equipment such as surveillance camera 302. To illustrate this, a connection to a camera is shown as a dotted section in FIG. 6. The left side of FIG. 6 shows an incoming copper pair from the centralized telephone facility in a similar manner to PAN 112. It is first connected to a circuit 410 which provides protection to the node function from lightning, surges, voltage spikes, and accidental cross connections with power lines. The signals from this incoming connection are then taken through low frequency pass filter 402 to power generation circuit 402.

Since, in at least one embodiment of the present invention, power requirements in the basic PPN 110 are much less than for PAN 112, it is possible that a standard −48 volts may be sufficient. If −48 volt power is supplied, multiple copper wire pairs may be required. A further possibility is for −48 volts from the central telephone battery to be carried on both the Ring and Tip wires, both of which would need to be terminated on the ground wire. Although the Ring (or both) wires of these pairs will be terminated on an electrical ground wire, the voltage will be smaller than the original −48 due to resistive loss, and so voltage conversion may be required.

Thus, power circuit 402 will generate a local working voltage (e.g., −48 volts) from the incoming derived or unmodified power voltages. As in the case of PAN 112, the power generating circuitry may be duplicated to provide fault tolerance, if required, to increase the overall reliability of the node. The local working voltage then passes through low pass filter 500 before being available for transfer to the Wi-Fi transceiver or other equipment by means of PSE circuit 418 or an inverter (not shown) as described for FIGS. 4 and 5 above. As with PAN 112, camera 302 may be coupled to the power and communications of PSN 110 through PSE 406.

VII. Active Node Source Pair Generation

Base equipment located at the central telephony installation may be used, in at least one embodiment of the present invention, to reliably supply the combined power and xDSL signals through the copper wire connections to each PAN 112 and PSN 300, and at least power for each PPN 110. Each PowerReach Node is usually supplied with these resources individually.

FIG. 7 discloses exemplary equipment that may be located at a central telephony installation. In the case of PPN 110, the power may, in some instances, be supplied directly from the telephony installation's batteries, and possibly applied to both Ring and Tip wires. For all PPN where such is not the case, and for all PAN 112 and PSN 300, derived power 708 (e.g., ±190 volts) is generated per individual line by means of generating equipment, optionally duplicated or made fault tolerant, fed from the telephony installation's batteries. The power so generated is then fed through a low pass filter 710, and merged with the xDSL signal.

The xDSL signals may be generated by one or more DSLAM units 700 which may supply multiple subscribers, and may obtain source data from the Internet in the form of multiplexed digital signals over optical fiber cables, or via wireless communication including technologies such as microwave antennae, or via electrical cables communicating using media such as, for example, SONET. In order to provide optional fault tolerant service, duplicate DSLAM units 700 may be provided as shown in FIG. 7, with A/B switch 702 to select the preferred server. As an alternative (not shown), optional fault tolerant service may also be provided using n+m redundancy, with a matrix switch for selecting an operable channel. The selected channel traverses a high pass filter 704 before being merged with the selected power source 708. The merged signals are then passed through a circuit 706 which provides protection from lightning, surges, voltage spikes, and accidental cross connections with power lines.

The present invention includes, in at least one embodiment of the present invention, a wide area network may be installed using conventional copper transmission lines. This implementation may allow for easy and cost-effective implementation of a municipal or public access wireless network in locations that are convenient to provide universal or overlapping coverage to subscribers. Further, peripheral devices may be integrated into the system to allow for additional functionality that may benefit the public, for example, surveillance cameras to assist in public security, information displays for informing the public of civic events or during an emergency, etc.

Accordingly, it will be apparent to persons skilled in the relevant art that various changes in forma and detail can be made therein without departing from the spirit and scope of the invention. Thus the breadth and scope of the present invention should not be limited by any of the above-described exemplary embodiments, but should be defined only in accordance with the following claims and their equivalents.

What is claimed:

1. An access point, comprising:
   at least one DC/DC voltage converter, coupled to at least one copper telephony transmission line, the at least one DC/DC voltage converter enabled to draw operational power from the at least one copper telephony transmission line;
   a wireless communication device, coupled to the at least one DC/DC voltage converter and the at least one copper telephony transmission line, the wireless communication device enabled to draw operational power from the at least one copper telephony transmission line via the at least one DC/DC voltage converter and communicate over the at least one copper telephony transmission line;
   wherein the access point receives wireless data through the wireless communication device which is then conveyed via the at least one copper telephony transmission line to a central telephony installation, and receives data from the central telephony installation via the at least one copper telephony transmission line which is then wirelessly transmitted by the wireless communication device to a subscriber.

2. The access point of claim 1 wherein the access point is mountable on at least one of a grounded copper telephony transmission line, a grounded building or a grounded utility pole.

3. The access point of claim 1, wherein the at least one copper telephony transmission line is at least one of an existing aerial telephony transmission line or an existing buried telephony transmission line, the copper telephony transmission line further enabled to provide the DC/DC voltage converter with a transmission voltage which is converted to an operational voltage for use by the wireless communication device.

4. The access point of claim 3, wherein a transmission voltage of ±190 volts is converted to an operational voltage of −48V.

5. The access point of claim 1, wherein the access point contains two or more DC/DC voltage converters to provide redundancy by being enabled to switch from an active DC/DC voltage converter to another DC/DC voltage converter if the active DC/DC voltage converter fails.

6. The access point of claim 1, wherein the at least one DC/DC voltage converter is coupled to a power source separate from the main power grid, for providing power during a power outage.

7. The access point of claim 1, wherein the access point is an active access point coupled to a gateway device enabled to convey information to and from the Internet in order to provide Internet access to subscribers communicating using wireless enabled computing devices.

8. The access point of claim 1, wherein the access point is a passive access point which conveys received information to, and receives information from, at least one of an active access point or a central telephony installation by means of a radio backhaul.

9. The access point of claim 1, wherein a peripheral device is coupled to the access point, the peripheral device sensing information which is then conveyed through the access point to the at least one copper telephony transmission line, and information is received by the peripheral device from the at least one copper telephony transmission line through the access point.

10. The access point of claim 9, wherein the peripheral device may be at least one of a camera, a visual display device, an audio device or other control or sensing device.

11. The access point of claim 9, wherein peripheral devices coupled to different access points may share a centralized memory.

12. A wireless communication system, comprising:
one or more access points each coupled to at least one copper telephony transmission line;
at least one central telephony installation coupled to at least one copper telephony transmission line;
at least one DC/DC voltage converter in each of the one or more access points, the at least one DC/DC voltage converter being coupled to the at least one copper telephony transmission line and enabled to draw operational power from the at least one copper telephony transmission line;
a wireless communication device in each of the one or more access points, the wireless communication device being coupled to the DC/DC voltage converter and the at least one copper telephony transmission line and enabled to draw operational power from the at least one copper telephony transmission line via the DC/DC voltage converter and communicate over the at least one copper telephony transmission line;
wherein the one or more access points receive data through each wireless communication device which is then conveyed via the at least one copper telephony transmission line to the at least one central telephony installation, and receives data from the at least one central telephony station, via the at least one copper telephony transmission line, which is then wirelessly transmitted by each wireless communication device to a subscriber.

13. The system of claim 12, wherein the access point is mountable on at least one of a grounded copper telephony transmission line, a grounded building or a grounded utility pole.

14. The system of claim 12, wherein the at least one copper telephony transmission line is at least one of an existing aerial telephony transmission line or an existing buried telephony transmission line, the copper telephony transmission line further enabled to provide the DC/DC voltage converter with a transmission voltage which is converted to an operational voltage for use by the wireless communication device.

15. The system of claim 14, wherein a transmission voltage of ±190 volts is converted to an operational voltage of −48V.

16. The system of claim 12, wherein each of the one or more access points contains two or more DC/DC voltage converters to provide redundancy by being enabled to switch from an active DC/DC voltage converter to another DC/DC voltage converter if the active DC/DC voltage converter fails.

17. The system of claim 12, wherein at least one DC/DC voltage converter in each access point is coupled to a power source separate from the main power grid, for providing power during a power outage.

18. The system of claim 12, wherein at least one access point of the one or more access points is an active access point coupled to a gateway device enabled to convey information to and from the Internet in order to provide Internet access to subscribers communicating using wireless enabled computing devices.

19. The system of claim 12, wherein the one or more access points are passive access points which convey received information to, and receives information from, at least one of an active access point or a central telephony installation by means of a radio backhaul.

20. The system of claim 12, wherein a peripheral device is coupled to at least one access point of the one or more access points, the peripheral device sensing information which is then conveyed through the access point to the at least one copper telephony transmission line, and information is received by the peripheral device from the at least one copper telephony transmission line through the access point.

21. The system of claim 20, wherein the peripheral device may be at least one of a camera, a visual display device, an audio device or other control or sensing device.

22. The system of claim 20, wherein peripheral devices coupled to different access points may share a centralized memory.

23. The system of claim 12, wherein the at least one central telephony station includes at least one digital signal line access multiplexer (DSLAM).

24. The system of claim 23, wherein the at least one central telephony station includes two or more DSLAMs to provide redundancy, wherein the system is configured to switch from an active DSLAM to another DSLAM if the active DSLAM fails.

\* \* \* \* \*